(12) United States Patent
Rose

(10) Patent No.: US 8,958,818 B2
(45) Date of Patent: Feb. 17, 2015

(54) PRESENTING MAPS ON A CLIENT DEVICE

(71) Applicant: Robert Brett Rose, Boulder, CO (US)

(72) Inventor: Robert Brett Rose, Boulder, CO (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/765,477

(22) Filed: Feb. 12, 2013

(65) Prior Publication Data

US 2014/0228054 A1    Aug. 14, 2014

(51) Int. Cl.
  *H04Q 7/20* (2006.01)
  *H04W 4/02* (2009.01)

(52) U.S. Cl.
  CPC ..................... *H04W 4/02* (2013.01)
  USPC .......... 455/456.1; 455/456.3; 455/414.1; 455/407; 455/418

(58) Field of Classification Search
  USPC ........................................... 455/456.1
  See application file for complete search history.

(56) References Cited

U.S. PATENT DOCUMENTS

| | | | |
|---|---|---|---|
| 8,254,961 B2 * | 8/2012 | Moon et al. | 455/456.3 |
| 2010/0121567 A1 | 5/2010 | Mendelson | |
| 2010/0125409 A1 | 5/2010 | Prehofer | |
| 2011/0105092 A1 | 5/2011 | Felt et al. | |
| 2012/0158297 A1 | 6/2012 | Kim et al. | |

* cited by examiner

*Primary Examiner* — Charles Appiah
*Assistant Examiner* — Randy Peaches
(74) *Attorney, Agent, or Firm* — Leydig, Voit & Mayer, Ltd.

(57) ABSTRACT

A system and method associated with displaying a map on a client device. The method includes transmitting context data related to the client device to a server, where the server is configured to identify that a location-specific map corresponding to a location of the client device is available to be displayed based to the context data; and receiving a signal from the server to display a prompt indicating that the location-specific map is available to be displayed on the client device, where the server determines whether to transmit the signal based on the context data.

16 Claims, 6 Drawing Sheets

PRESENTING MAPS ON A CLIENT DEVICE

BACKGROUND

Most people today carry mobile phones. Many mobile phones have a street map application that assists people with navigating to a certain location or address. However, once the user is at the location or address, the particular location or address may have a complex internal layout with which the user may not be familiar. For example, a user may use the street map application to navigate to the address of a shopping mall because the user is interested in shopping at a particular store within the shopping mall. However, once the user arrives at the shopping mall, the user may not be sure how to get to the particular store. To find the store, the user would first need to locate a directory or view a map of the shopping center, and then subsequently go to the store.

SUMMARY

One embodiment provides a method for displaying a map on a mobile phone. The method includes receiving, at a processing device, context data related to the mobile phone; identifying, at the processing device, that a location-specific map is available that corresponds to the context data; and determining whether to display a prompt indicating that the location-specific map is available to be displayed on the mobile phone based on the context data, wherein the prompt is displayed a first time that the processing device identifies that the location-specific map is available, and wherein the prompt is not displayed a subsequent time that the processing device identifies that the location-specific map is available based on a user selection entered in response to a previously displayed prompt associated with the location-specific map.

Another embodiment provides a method associated with displaying a map on a client device. The method includes providing context data related to the client device to a processing device, where the processing device is configured to identify that a location-specific map corresponding to a location of the client device is available to be displayed based on the context data; and receiving a signal from the processing device to display a prompt indicating that the location-specific map is available to be displayed on the client device, where the processing device determines whether to transmit the signal based on the context data.

Yet another embodiment provides a system for displaying a map on a mobile device. The system includes one or more databases storing location-specific maps and metadata corresponding to mobile devices and/or users of the mobile devices; a mobile device that includes a hardware component configured to detect a location of the mobile device; and a server in communication with the mobile device via a data network. The server is configured to: receive data related to the location of the mobile device, identify that a location-specific map is available that corresponds to the location of the mobile device, and, based on the metadata corresponding to mobile devices and/or users of the mobile devices, determine whether to display a prompt on the mobile device indicating that the location-specific map is available to be displayed, wherein the prompt is displayed a first time that the server determines that the location of the mobile device corresponds to the location-specific map, and wherein, based on the metadata, the prompt is not displayed a subsequent time that the server determines that the location of the mobile device corresponds to the location-specific map.

DETAILED DESCRIPTION

Figure 1:
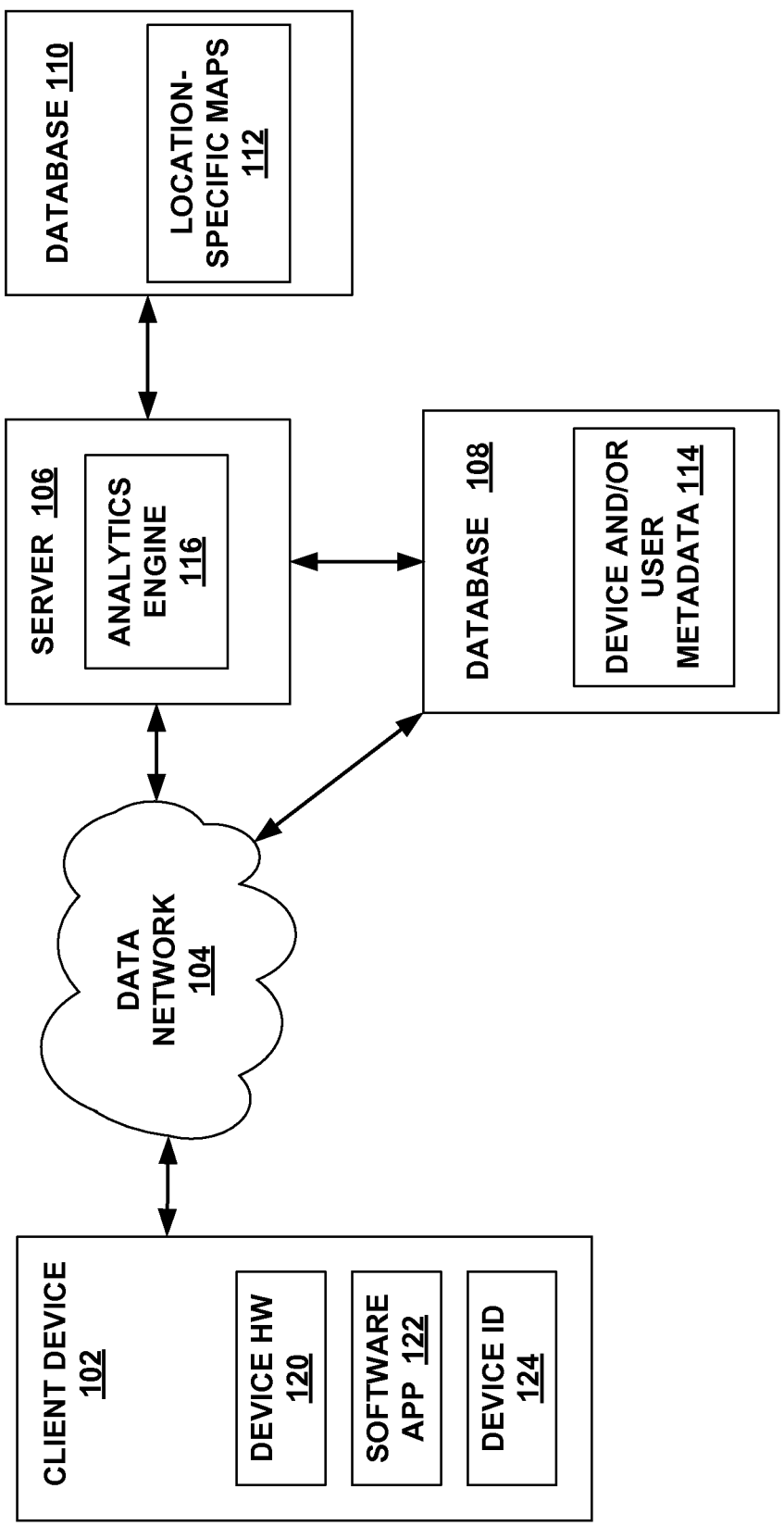
FIG. 1 is a block diagram of an example system for delivering a map to a device, according to an example embodiment.

Some embodiments of the disclosure provide for delivering a map to a user. The map is a map specific to a particular location. Some examples include a map of the layout or plan of: an airport, a rail or transit station, a museum, a retail location, a shopping mall, a university, a stadium, an event center, an exhibition hall, a convention center, a casino, a hotel, a library, a religious center, a restaurant, an amusement park, or a city park, among others.

Location-specific maps are a great navigation tool, but most people do not know that such maps may be available on user's mobile device. Also, even if a map of a particular location is available, and the user knows that the map is available, some users may not remember that the map is available when the user arrives at those places. For example, a user may have read somewhere that a certain shopping mall has indoor maps available on the user's mobile device. However, once the user is at the shopping mall, the user might not think to open the location-specific map. In another example scenario, a user who is walking in Central Park in New York City may know that the park includes a zoo, a lake, and many more attractions. The user might not know that a map is available on their mobile device that could not only show all the attractions, but could also have a live-updating icon showing exactly where the user is located in relation to the attractions.

According to embodiments of the disclosure, a hardware component or a software application, such as a maps application, on a mobile device is configured to analyze the user's context. The context includes one or more items of data about the mobile device and/or user of the mobile device. Examples include: device location, calendar events, purchase history, applications recently used, search history, recent user activity, user preferences, emails, text messages, direction of travel, speed of travel, among others.

The context data is transmitted by the mobile device, e.g., by an application such as the map application and/or an operating system of the mobile device, to one or more servers. The one or more servers analyze the context data and correlate the context data (and/or other data corresponding to the user of the mobile device to which the server has access) to identify any location-specific maps that could be presented to the user on the mobile device.

If a map is identified based on the analysis, then a prompt is displayed on the mobile device asking the user whether the user would like to view the map. If confirmed, then the map is displayed. The user may be provided the option to not show the map in this instance or to never be prompted to display this particular map in the future. In some embodiments, the user's selection of whether to display the map is also transmitted to the one or more servers to be used in future analyses.

According to embodiments of the disclosure, not all available location-specific maps are displayed and/or prompted to be displayed. For example, if the user is a frequent business traveler and is at SFO airport several times per week, then the user is likely to be familiar with the airport layout. Therefore, the user may not want to be bombarded with prompts to view a map of SFO airport each time the user enters the airport. In this case, for example, based on frequency of visiting a particular location, the map is not displayed to the user nor does the user receive a prompt that a map is available. In some embodiments, the map application allows the user to manually navigate to a map to have the mobile device display the map, even when no prompt is provided to the user.

In another example implementation, a user may have been searching for a particular item online, e.g., a power tool. When the user enters a hardware store, the application identifies that a map of the hardware store is available based on analyzing the user's context, e.g., the user's location. A prompt can be displayed to present an indoor map of the hardware store. If the user chooses to have the map displayed, then the application and/or server may analyze the user's search history to detect that the user has been recently searching for power tools. An overlay or notification may be displayed, for example, a "pin," with a location of power tools within the hardware store and directions on the indoor map as to how to reach the location for power tools.

In some embodiments, users may have privacy settings/options of whether their context information, such as location, should be included in the analysis performed by the one or more servers and/or which metadata should be included in the analysis performed by the one or more servers.

FIG. 1 is a block diagram of an example system for delivering a map to a device, according to an example embodiment. The system includes a client device 102, a data network 104, one or more servers 106, and databases 108 and 110.

The client device 102 can be any type of computing device, including a personal computer, laptop computer, mobile phone with computing capabilities, or any other type of device. The client device 102 includes, among other things, device hardware 120, a software application 122, a device identifier (ID) 124, other application(s), a communications client, output devices (e.g., a display), and input devices (e.g., keyboard, mouse, touch screen), etc. In some embodiments, a client device 102 may act as both an output device and an input device.

Device hardware 120 includes components capable of detecting and/or measuring real-world phenomena at the client device 102, e.g., a GPS (global positioning system) module, an accelerometer, a compass, and/or a light intensity sensor. The software application 122 is configured to display maps on the client device 102, such as a maps application. According to various embodiments, the software application 122 can be implemented in the OS (operating system) of the client device 102 or as a stand-alone application installed on the client device 102. The device ID 124 is a unique identifier corresponding to the client device 102. In some embodiments, the device ID 124 also corresponds to a particular user.

The data network 104 can be any type of communications network, including an Internet network (e.g., wide area network (WAN) or local area network (LAN)), wired or wireless network, or mobile phone data network, among others.

The client device 102 is configured to communicate with a server 106 via the data network 104. The server 106 includes an analytics engine 116. The server 106 is in communication with databases 108 and 110. In some embodiments, the database 108 stores metadata 114 corresponding to users and/or client devices, and the database 110 stores one or more location-specific maps 112. Examples of location-specific maps 112 include maps of the layout or plan of: an airport, a rail or transit station, a museum, a retail location, a shopping mall, a university, a stadium, an event center, an exhibition hall, a convention center, a casino, a hotel, a library, a religious center, a restaurant, an amusement park, a city park, among others.

The metadata 114 corresponding to users and/or client devices may include information about individual users and/or client devices. Examples include: device location, user calendar events, user purchase history, device applications recently used, user and/or device search history, recent user activity, user preferences, emails, text messages, device direction of travel, device speed of travel, among others. In some embodiments, the client device 102 is configured to communicate with the database 108 via the data network 104.

As described in greater detail herein, one or more items of context data may be transmitted from the client device 102 to the server 106 via the network. In some embodiments, the transmission of the context data may be periodic, e.g., every minute. The analytics engine 116 within the server 106 receives the context data. The analytics engine 116 may also retrieve metadata 114 corresponding to the client device 102 and/or the user of the client device 102 from the database 108. The analytics engine 116 analyzes the context data and/or metadata 114 to identify that at least one location-specific map 112 is available and may be relevant to the user of the client device 102. The analytics engine 116 transmits a signal to the software application 112 to prompt the user as to whether the map should be displayed. If the user selects that the map should be displayed, then the software application 112 retrieves the map from the database 110 and the map is displayed on the client device 102. Also, the user's selection of whether to display the map is transmitted to the database 114 and stored as metadata 114 corresponding to the user and/or device.

In one embodiment, databases 108 and 110 comprise a single database. In another embodiment, databases 108 and 110 comprise separate databases.

Figure 2:
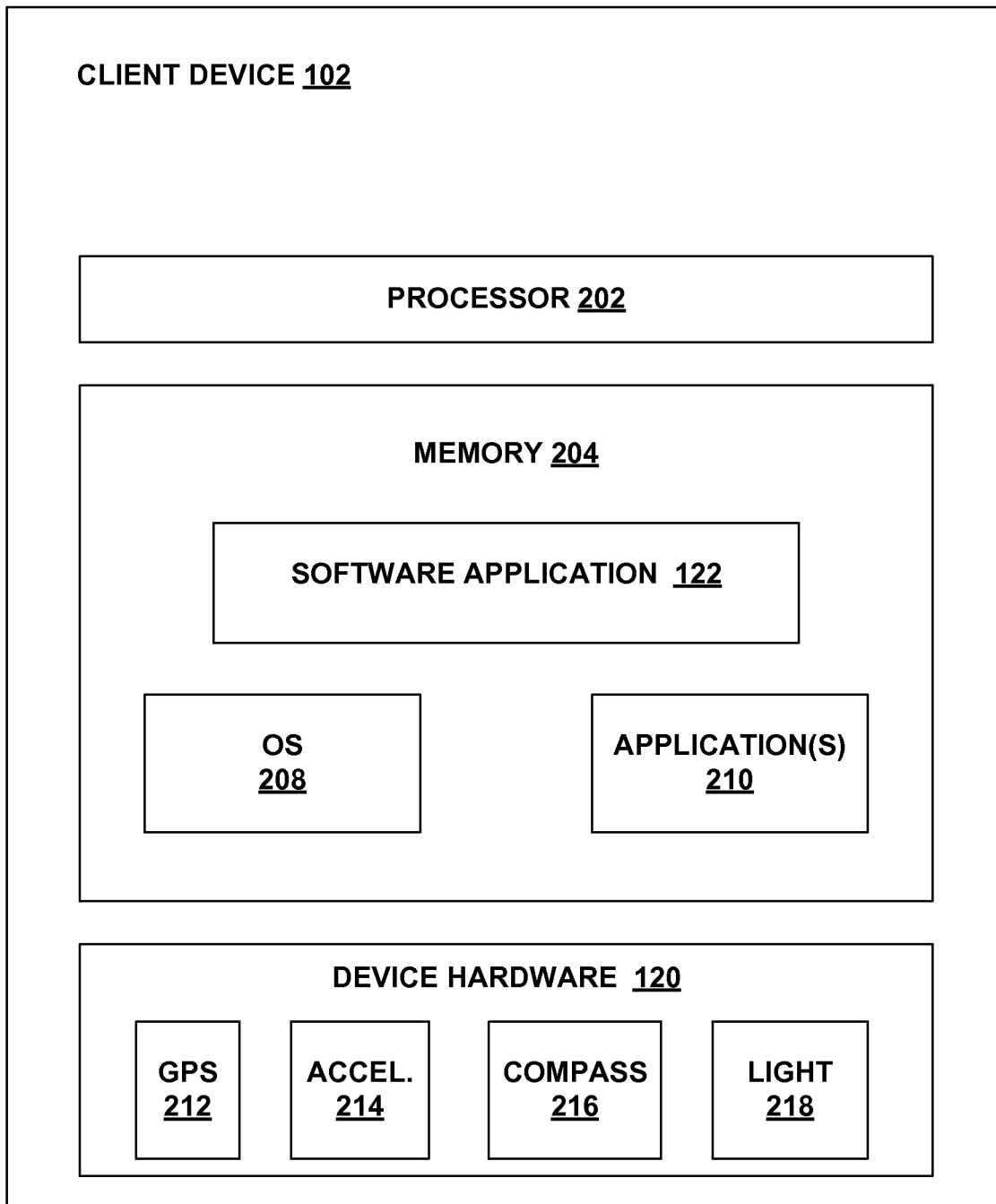
FIG. 2 is a block diagram of the arrangement of components of a client device configured to display a location-specific map, according to an example embodiment.

FIG. 2 is a block diagram of the arrangement of components of a client device 102 configured to display a location-specific map, according to an example embodiment. As shown, client device 102 includes device hardware 120, a processor 202, and memory 204, among other components (not shown). The device hardware 120 includes, for example, a GPS module 212, an accelerometer 214, a compass 216, and a light sensor 218.

The memory 204 includes various applications that are executed by processor 202, including installed applications 210, an operating system 208, and software application 122. For example, installed applications 210 may be downloaded and installed from an applications store.

As described, the software application 122 is configured to upload context data, e.g., received from the device hardware, to databases 108, 110 and/or server 106. As described herein, the analytics engine 116 on the server 106 is configured to receive the context data and/or access metadata 114 and perform analysis to identify one or more location-specific maps 112 to display on the client device 102.

Figure 3:
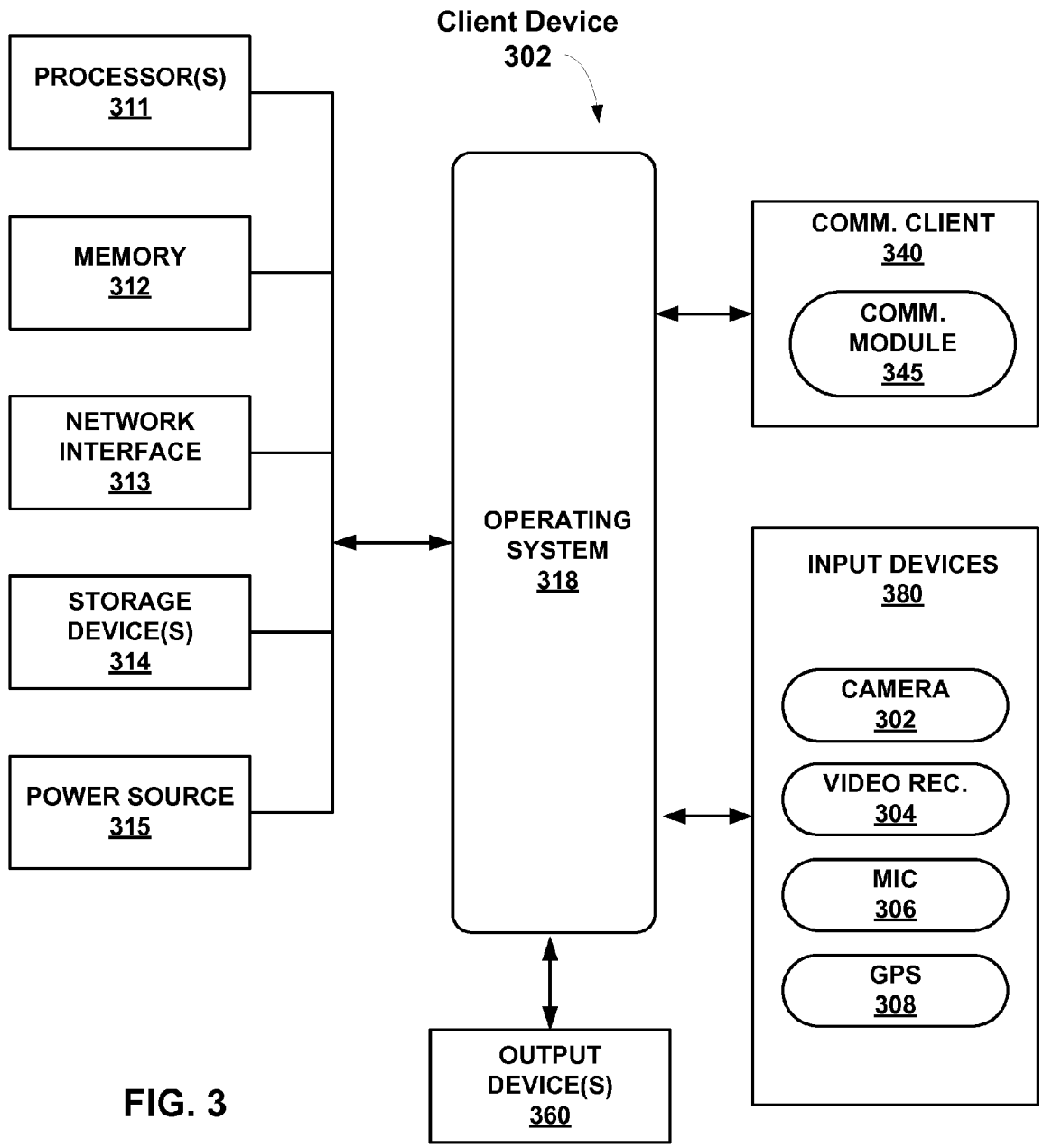
FIG. 3 is a block diagram of example functional components for a client device, according to an example embodiment.

FIG. 3 is a block diagram of example functional components for a client device 302, according to one embodiment. One particular example of client device 302 is illustrated. Many other embodiments of the client device 302 may be used. In the illustrated embodiment of FIG. 3, the client device 302 includes one or more processor(s) 311, memory 312, a network interface 313, one or more storage devices 314, a power source 315, output device(s) 360, and input device(s) 380. The client device 302 also includes an operating system 318 and a communications client 340 that are executable by the client. Each of components 311, 312, 313, 314, 315, 360, 380, 318, and 340 is interconnected physically, communicatively, and/or operatively for inter-component communications in any operative manner.

As illustrated, processor(s) 311 are configured to implement functionality and/or process instructions for execution within client device 302. For example, processor(s) 311 execute instructions stored in memory 312 or instructions stored on storage devices 314. Memory 312, which may be a non-transient, computer-readable storage medium, is configured to store information within client device 302 during operation. In some embodiments, memory 312 includes a temporary memory, area for information not to be maintained when the client device 302 is turned OFF. Examples of such temporary memory include volatile memories such as random access memories (RAM), dynamic random access memories (DRAM), and static random access memories (SRAM). Memory 312 maintains program instructions for execution by the processor(s) 311.

Storage devices 314 also include one or more non-transient computer-readable storage media. Storage devices 314 are generally configured to store larger amounts of information than memory 312. Storage devices 314 may further be configured for long-term storage of information. In some examples, storage devices 314 include non-volatile storage elements. Non-limiting examples of non-volatile storage elements include magnetic hard disks, optical discs, floppy discs, flash memories, or forms of electrically programmable memories (EPROM) or electrically erasable and programmable (EEPROM) memories.

The client device 302 uses network interface 313 to communicate with external devices via one or more networks, such server 106 and/or database 108 shown in FIG. 1. Network interface 313 may be a network interface card, such as an Ethernet card, an optical transceiver, a radio frequency transceiver, or any other type of device that can send and receive information. Other non-limiting examples of network interfaces include wireless network interface, Bluetooth®, 3G and WiFi® radios in mobile computing devices, and USB (Universal Serial Bus). In some embodiments, the client device 302 uses network interface 313 to wirelessly communicate with an external device, a mobile phone of another, or other networked computing device.

The client device 302 includes one or more input devices 380. Input devices 380 are configured to receive input from a user through tactile, audio, video, or other sensing feedback. Non-limiting examples of input devices 380 include a presence-sensitive screen, a mouse, a keyboard, a voice responsive system, camera 302, a video recorder 304, a microphone 306, a GPS module 308, or any other type of device for detecting a command from a user or sensing the environment. In some examples, a presence-sensitive screen includes a touch-sensitive screen.

One or more output devices 360 are also included in client device 302. Output devices 360 are configured to provide output to a user using tactile, audio, and/or video stimuli. Output devices 360 may include a display screen (part of the presence-sensitive screen), a sound card, a video graphics adapter card, or any other type of device for converting a signal into an appropriate form understandable to humans or machines. Additional examples of output device 360 include a speaker, a cathode ray tube (CRT) monitor, a liquid crystal display (LCD), or any other type of device that can generate intelligible output to a user. In some embodiments, a device may act as both an input device and an output device.

The client device 302 includes one or more power sources 315 to provide power to the client device 302. Non-limiting examples of power source 315 include single-use power sources, rechargeable power sources, and/or power sources developed from nickel-cadmium, lithium-ion, or other suitable material.

The client device 302 includes an operating system 318, such as the Android® operating system. The operating system 318 controls operations of the components of the client device 302. For example, the operating system 318 facilitates the interaction of communications client 340 with processors 311, memory 312, network interface 313, storage device(s) 314, input device 180, output device 160, and power source 315.

As also illustrated in FIG. 3, the client device 302 includes communications client 340. Communications client 340 includes communications module 345. Each of communications client 340 and communications module 345 includes program instructions and/or data that are executable by the client device 302. For example, in one embodiment, communications module 345 includes instructions causing the communications client 340 executing on the client device 302 to perform one or more of the operations and actions described in the present disclosure. In some embodiments, communications client 340 and/or communications module 345 form a part of operating system 318 executing on the client device 302.

Figure 4:
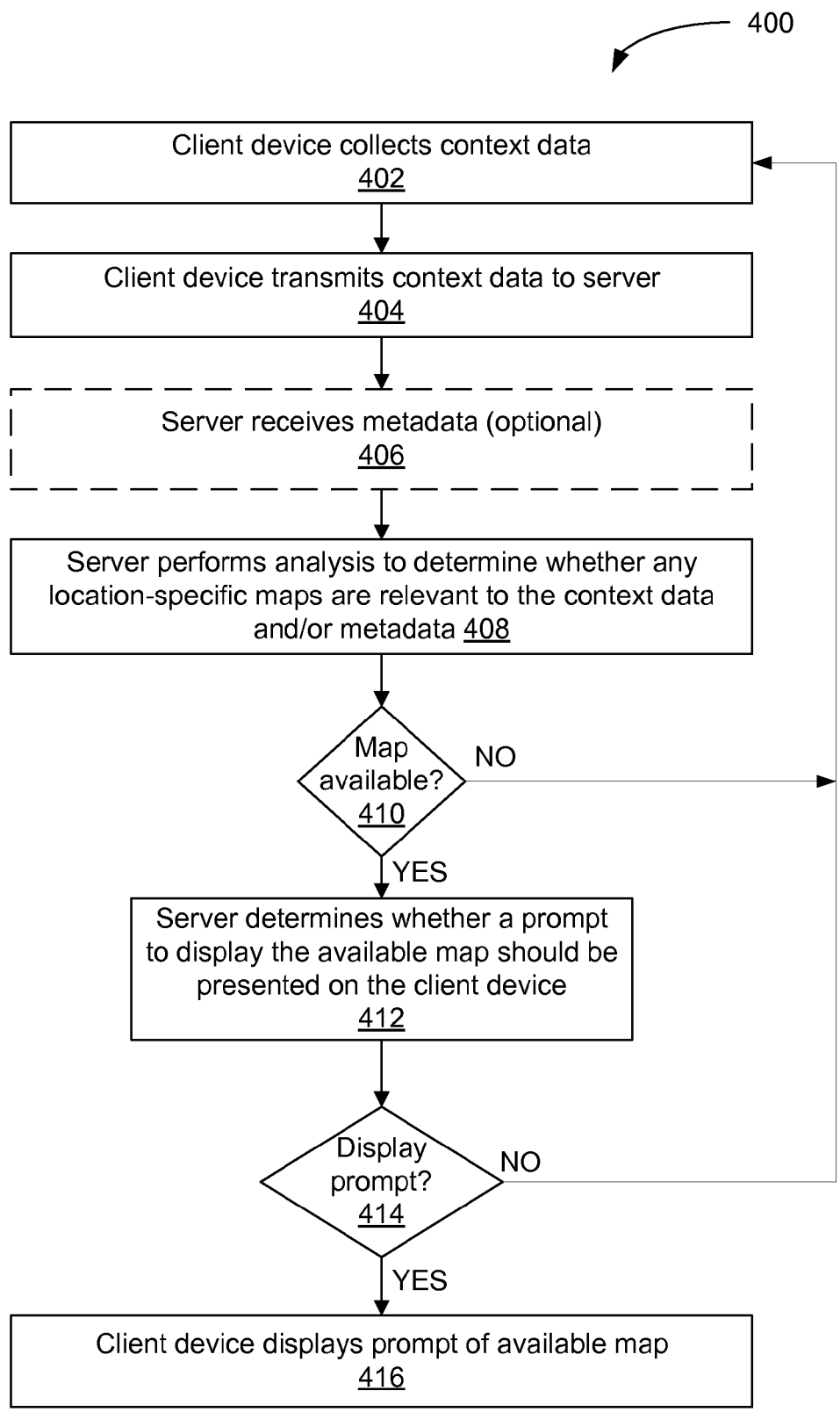
FIG. 4 is a flow diagram for delivering a map to a device, according to an example embodiment.

FIG. 4 is a flow diagram for delivering a map to a device, according to an example embodiment. Persons skilled in the art will understand that even though the method 400 is described in conjunction with the systems of FIGS. 1-3, any system configured to perform the method stages is within the scope of embodiments of the disclosure.

As shown, the method 400 begins at stage 402, where a client device collects context data. The context data may be collected by device hardware 120 (e.g., GPS location information) or by a software application (e.g., search history from a browser application). In one embodiment, the client device is a mobile phone. At stage 404, the client device transmits context data to a server. In some embodiments, the client device transmits the context data to a database for storage. In other embodiments, the client device transmits the context data to the server and the database for storage.

At stage 406, server receives metadata from a database. As described above, the metadata may include additional data corresponding to the client device and/or the user of the client device. In some embodiments, stage 406 is optional and is omitted.

At stage 408, the server performs analysis to determine whether any location-specific maps are relevant to the context data and/or metadata. According to various embodiments, the location-specific maps may be indoor maps or outdoor maps. In one embodiment, location information of the client device is used to identify location-specific maps relevant to the location of the client device. In another embodiment, location information of the client device in addition to other context data and/or metadata is used to identify location-specific maps relevant to the user and/or client device.

At stage 410, the server determines whether any location-specific maps are available. If the server determines no location-specific maps are available, then the method 400 returns to stage 402, described above. If the server determines that at least one location-specific map is available, then the method 400 proceeds to stage 412.

At stage 412, the server determines whether a prompt to display the available map should be presented on the client device. The decision as to whether to display a prompt about the available map is based on one or more context data and/or metadata. For example, if a user is frequently at a location that is associated with a location-specific map, the server may determine to not prompt to display the available map, since the user is likely already familiar with the layout of the location. In another example, the user may have previously been to a location that is associated with a location-specific map, the prompt to display the map may have been presented to the user, and the user may have selected to never display a prompt for this map in the future. In such a case, the prompt to display the available map is not presented to the client device based on user preferences and map presentation history.

Also, in some embodiments, the prompt to display the map is presented to the user the first time that the user is at the location associated with the location-specific map. At subsequent times that the user is at the location, the map may not be displayed, as described above. For example, the prompt is not displayed when, based on the context data, the mobile device has been to a particular location more than a threshold number of times within a certain period of time.

At stage 414, if the server determines not to present a prompt to display the available map, then the method returns to stage 402, described above. If the server determines to present a prompt to display the available map, then the method proceeds to stage 416.

At stage 416, the client device displays a prompt to display the available map. The prompt may be generated by a software application and/or OS executing on the client device. In one embodiment, the prompt is displayed based on the client device receiving a signal from the server to display the prompt.

Figure 5:
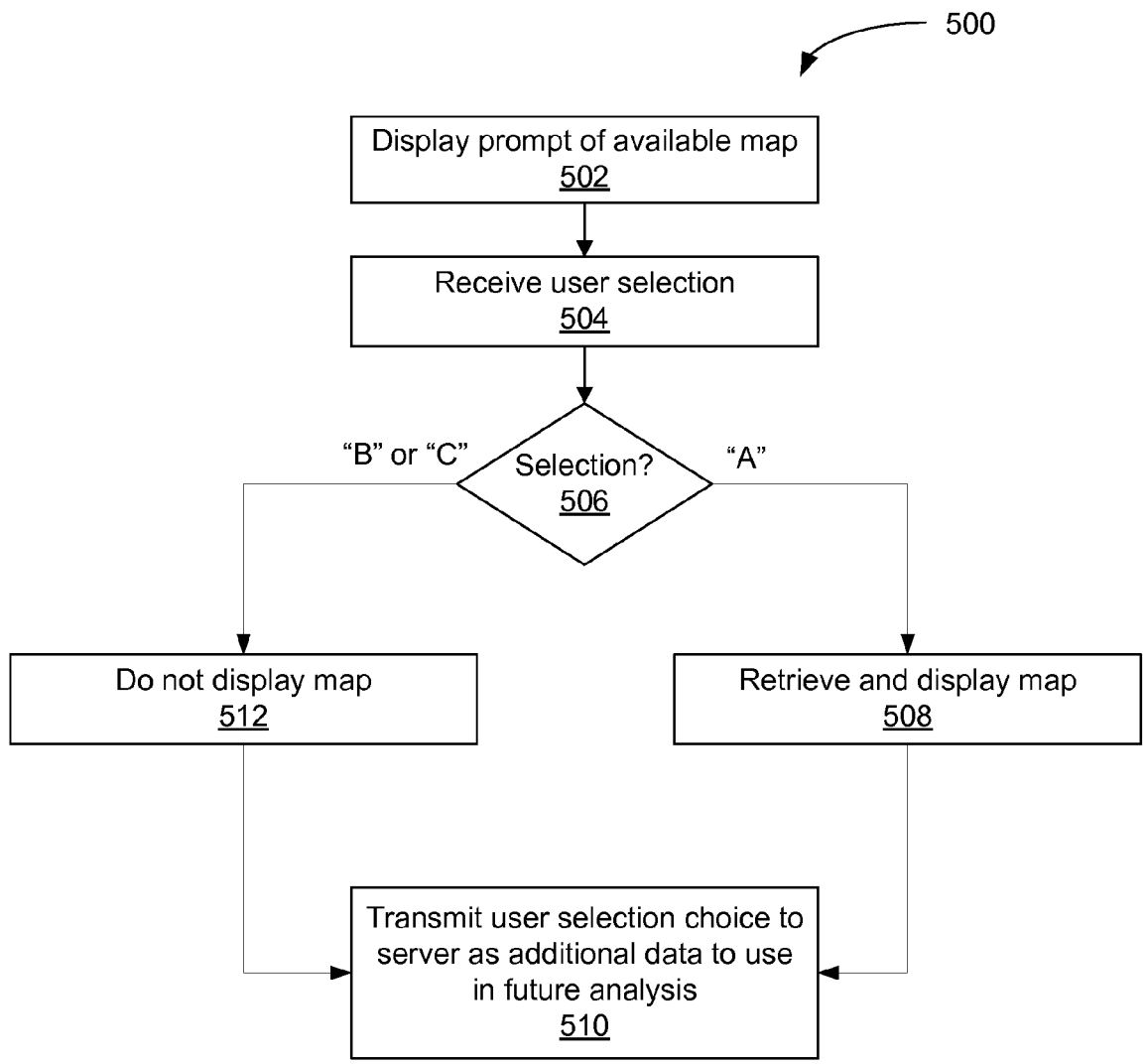
FIG. 5 is a flow diagram for displaying a location specific map and a feedback loop for storing map display preferences, according to an example embodiment.

FIG. 5 is a flow diagram for displaying a location specific map and a feedback loop for storing map display preferences, according to an example embodiment. Persons skilled in the art will understand that even though the method 500 is described in conjunction with the systems of FIGS. 1-3, any system configured to perform the method stages is within the scope of embodiments of the disclosure.

As shown, the method 500 begins at stage 502, where a client device displays a prompt to display an available location-specific map. In one embodiment, stage 502 in FIG. 5 is substantially similar to stage 416 in FIG. 4.

In one embodiment, the prompt may include three choices: (A) yes, display the map; (B) no, do not display the map in this instance; or (C) no, and never prompt to display this map in the future. In other embodiments, the prompt may include more, fewer, or different choices.

At stage 504, the client device receives a user selection of one of the choices in the prompt. Continuing with the example above of three prompt choices, "A," "B," or "C," at stage 506, if the client device determines that choice A is selected, then the method 500 proceeds to stage 508, where the client device retrieves and displays the map. The map may be retrieved from a database with which the client device is communicatively coupled. The method 500 then proceeds to stage 510, where the selection to display the map is transmitted to a database for storage. The selection may be used as metadata when making a future determination as to whether to display a prompt to display an available map.

Returning to stage 506, if the client device determines that either of choices B or C is selected, then the method 500 proceeds to stage 512, where the client device does not display a map and returns to the screen that was displayed prior to displaying the prompt. Then, at stage 510, the client device transmits the selection to not display the map to a database for storage for future analyses, as described above.

Figure 6:
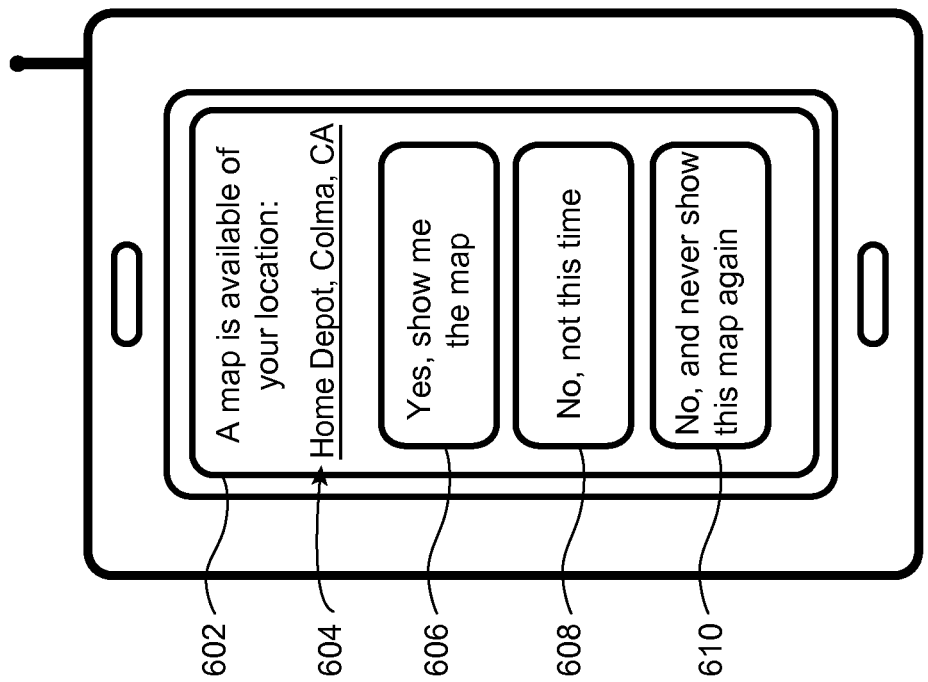
FIG. 6 is a conceptual diagram illustrating a user interface for displaying a prompt to display an available location-specific map, according to an example embodiment.

FIG. 6 is a conceptual diagram illustrating a user interface for displaying a prompt to display an available location-specific map, according to an example embodiment. As shown, a prompt 602 is displayed on a client device. As described, the prompt may be displayed when a location-specific map is available that is relevant to the location of the client device and/or metadata corresponding to the client device and/or user of the client device. The prompt includes an indication/name 604 of the location to which the location-specific map corresponds. In some embodiments, the prompt could also include a graphical thumbnail of the map so the user can see a preview of the map before making that choice. For example, seeing the map could help the user decide if the map will be useful or not.

In the example shown in FIG. 6, the prompt 602 includes three choices: (A) "Yes, show me the map" 606, (B) "No, not this time" 608, and (C) "No, never prompt to display this map again" 610. If the user selects choice 606, then the map is displayed; if the user selects choices 608 or 610, then the map is not displayed. Regardless of which choice is selected, information about which choice was selected is transmitted to a database for storage, to be used by the server when making future decisions about whether to display a prompt of an available location-specific map.

Figure 7:
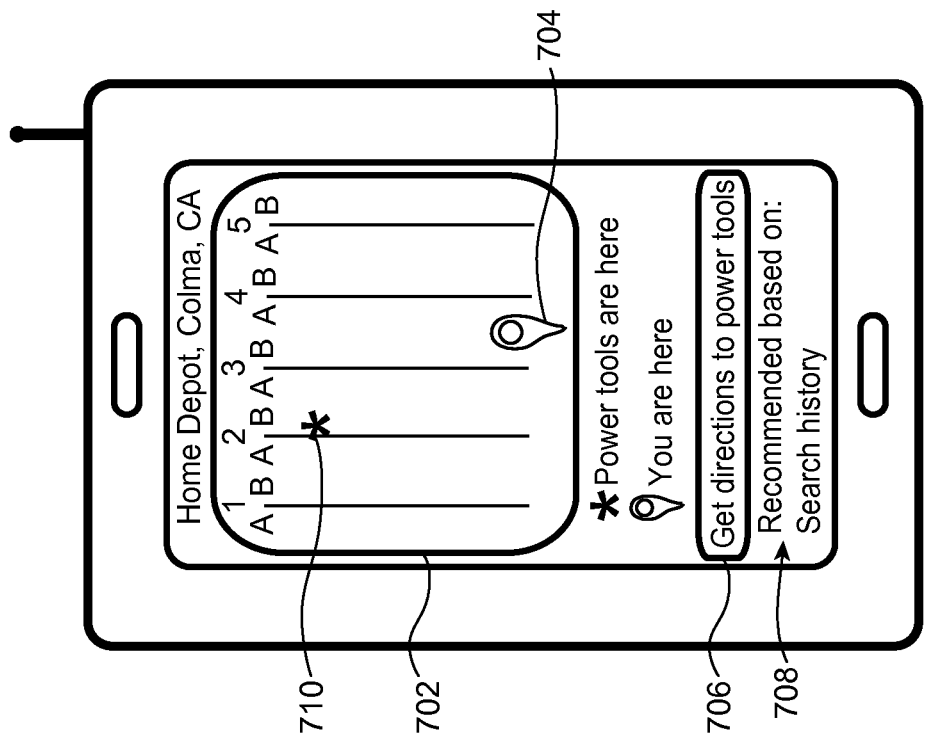
FIG. 7 is a conceptual diagram illustrating a user interface for displaying a location-specific map, according to an example embodiment.

FIG. 7 is a conceptual diagram illustrating a user interface for displaying a location-specific map, according to an example embodiment. As shown, a location-specific map 702 is displayed on a client device. In addition to displaying the location-specific map 702, the client device displays an icon 704 corresponding to the client device's physical location within the location-specific map 702.

In some embodiments, the location-specific map 702 may also include other information that may be relevant to the user based on context data and/or metadata corresponding to the client device and/or user. For example, if the user has been recently searching for power tools, and the location-specific map 702 is of a hardware store that sells power tools, then the specific location of power tools in the hardware store may be displayed in the location-specific map 702, such as via icon 710. An indication 708 may also be displayed that presents to the user information about how the additional relevant information was identified, e.g., by analyzing the user's search history. In some embodiments, a button 706 may provide the user with the option of displaying directions to a particular location within the location-specific map 702, such as, for example, to the power tools section of the hardware store. In another example, when a location-specific map of an airport is displayed, the additional relevant information displayed on the map may include a location of the gate of the user's flight (based on analyzing emails and/or airline reservation information for the user).

In some embodiments, the location-specific map may display relevant location information related to the client device context. For example, a server may identify that the client device is traveling on a highway and may display a map of relevant locations near the user's current location.

In some embodiments described above, the analytics engine 116 at the server 106 performed much of the analysis.

Other embodiments could be used in an offline situation, wherein map data is already loaded on the client device, the device hardware (e.g., GPS) is able to capture the user context, and a locally executed (i.e., by a processor at the client device) process analyzes the user context to determine that the user might be interested in the particular locally-stored map. With no data connection, these embodiments could specify that all indoor and "popular" outdoor maps such as Central Park in New York City, Golden Gate Park in San Francisco, etc. could be offered to the user by default in "offline mode."

Another embodiment of the disclosure provides "pre-approving" certain maps in certain locations for one time or every time. For instance, the user may be flying into a new airport and might want to tell the system to automatically open the available airport map as soon as the system detects that the user is in the airport. The user would merely open their phone after walking into the airport and the map would be there, ready to use. This embodiment could be implemented on a mobile device as well as a desktop interface.

Advantageously, embodiments of the disclosure provide a system and method for displaying a location-specific map on a client device based on context data and metadata associated with the client device and/or a user of the client device. According to embodiments of the disclosure, not all available maps are presented. As described above, in some instances, the prompt to display an available map may not be presented based on the context data and metadata associated with the client device and/or a user of the client device. In this manner, the user is not bombarded with prompts to display location-specific maps, which could become annoying or burdensome for the user to manage.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, comprising:
receiving, at a server device, context data related to a mobile device;
identifying, at the server device, that a location-specific map associated with the context data is available for display by the mobile device;
responsive to the identifying, transmitting a first signal to the mobile device to cause the mobile device to display a prompt, wherein the prompt includes a first selectable option to cause the mobile device to display the location-specific map and a second selectable option to cause the mobile device not to display the location-specific map;
receiving, at a first time, an indication of a selection of the first selectable option; and
responsive to receiving the indication of the selection of the first selectable option, transmitting a second signal to the mobile device to cause the mobile device to display the location-specific map.

2. The method according to claim 1, further comprising:
receiving, at a second time after the first time, an indication of a selection of the second selectable option; and
responsive to receiving the indication of the selection of the second selectable option, at a subsequent time that the processing device identifies that the location-specific map is available to for display by the mobile device, determining that the prompt should not be displayed and determining not to transmit a signal to the mobile device to cause the mobile device to display the prompt.

3. The method according to claim 1, wherein the context data corresponds to one or more of a location of the mobile device, calendar events, purchase history, search history, applications recently used on the mobile device, and preference settings.

4. The method according to claim 1, further comprising transmitting data corresponding to the location-specific map to the mobile device.

5. The method according to claim 4, further comprising transmitting a signal to the mobile device that causes the mobile device to display a visual marker on the location-specific map.

6. The method according to claim 1, further comprising:
determining not to transmit a signal corresponding to a prompt in response to the mobile device having been to a particular location more than a threshold number of times within a period of time.

7. The method according to claim 1, wherein the location-specific map is a map of a layout of: an airport, a rail or transit station, a museum, a retail location, a shopping mall, a university, a stadium, an event center, an exhibition hall, a convention center, a casino, a hotel, a library, a religious center, a restaurant, an amusement park, or a city park.

8. A method, comprising:
transmitting, by a client device, context data related to the client device to a server device;
receiving a signal from the server device to cause the client device to display a prompt indicating that a location-specific map associated with the context data is available for output by the client device;
causing the client device to output the prompt, wherein the prompt includes a first selectable option to cause the client device to output the location-specific map and a second selectable option to cause the client device not to output the location-specific map;
receiving a selection of the first selectable option;
transmitting an indication of the selection of the first selectable option to the server device; and
responsive to transmitting the indication, receiving data associated with the location-specific map for output by the client device.

9. The method according to claim 8, wherein the prompt includes a third selectable option, wherein selecting the third option causes the client device not to output the prompt at a future time when the client device is at a location corresponding to the location-specific map.

10. The method according to claim 8, wherein the context data corresponds to one or more of a location of the client device, calendar events, purchase history, search history, applications recently used on the client device, and preference settings.

11. The method according to claim 8, further comprising receiving a signal from the server device to cause the client device to display a visual marker on the location-specific map.

12. The method according to claim 11, wherein the visual marker corresponds to a location inside a retail store of an item searched using a search engine, or the visual marker corresponds to a location of a gate at an airport corresponding to an airline flight to be taken by a user of the client device.

13. The method according to claim 8, wherein the location-specific map is a map of a layout of: an airport, a rail or transit station, a museum, a retail location, a shopping mall, a university, a stadium, an event center, an exhibition hall, a convention center, a casino, a hotel, a library, a religious center, a restaurant, an amusement park, or a city park.

14. A system for displaying a map on a mobile device, comprising:
one or more databases storing location-specific maps;
a mobile device that includes a hardware component configured to detect a location of the mobile device; and
a server device in communication with the mobile device via a data network, the server device configured to:
receive data related to the location of the mobile device,
identify that a location-specific map is available for display by the mobile device that corresponds to the location of the mobile device,
responsive to identifying that a location-specific map is available for display by the mobile device, transmit a first signal to the mobile device to cause the mobile device to output a prompt, wherein the prompt includes a first selectable option to cause the mobile device to display the location-specific map and a second selectable option to cause the mobile device not to display the location-specific map,
receive an indication of a selection of the first selectable option, and
transmit a second signal to the mobile device to cause the mobile device to display the location-specific map.

15. The system according to claim 14, wherein the server device is configured not to transmit the first signal to the mobile device to cause the mobile device to output the prompt in response to the mobile device having been to a particular location more than a threshold number of times within a period of time.

16. The system according to claim 14, wherein the location-specific map is a map of a layout of: an airport, a rail or transit station, a museum, a retail location, a shopping mall, a university, a stadium, an event center, an exhibition hall, a convention center, a casino, a hotel, a library, a religious center, a restaurant, an amusement park, or a city park.

* * * * *